(12) United States Patent
Sawaya

(10) Patent No.: US 12,555,150 B2
(45) Date of Patent: Feb. 17, 2026

(54) COLOR DESIGN PROCESS AND SYSTEM

(71) Applicant: Lori A. Sawaya, Phoenix, AZ (US)

(72) Inventor: Lori A. Sawaya, Phoenix, AZ (US)

(73) Assignee: THE LAND OF COLOR, LLC, Phoenix, AZ (US)

( * ) Notice: Subject to any disclaimer, the term of this patent is extended or adjusted under 35 U.S.C. 154(b) by 264 days.

(21) Appl. No.: 18/334,230

(22) Filed: Jun. 13, 2023

(65) Prior Publication Data

US 2024/0420199 A1 Dec. 19, 2024

(51) Int. Cl.
*G06Q 30/00* (2023.01)
*G06Q 10/0837* (2023.01)
*G06Q 30/0601* (2023.01)

(52) U.S. Cl.
CPC ..... *G06Q 30/0621* (2013.01); *G06Q 10/0837* (2013.01); *G06Q 30/0631* (2013.01)

(58) Field of Classification Search
CPC .................................................. G06Q 30/0621
See application file for complete search history.

(56) References Cited

U.S. PATENT DOCUMENTS

| 2022/0076310 A1* | 3/2022 | Caruso | G06Q 30/0641 |
| 2023/0245220 A1* | 8/2023 | Crogan | G06Q 30/0635 |
| | | | 705/26.81 |
| 2024/0104795 A1 | 3/2024 | Janeczko | |
| 2024/0273388 A1* | 8/2024 | Hu | G06N 20/00 |

OTHER PUBLICATIONS

Mcauley, Julian, et al. "Image-based recommendations on styles and substitutes." Proceedings of the 38th international ACM SIGIR conference on research and development in information retrieval. 2015.*

* cited by examiner

*Primary Examiner* — Kathleen Palavecino
(74) *Attorney, Agent, or Firm* — Allan Watts (57) ABSTRACT

Processes and systems for recommending to clients colors and color schemes for design purposes based on measured existing surface colors without a color strategist traveling to the worksite. A design process includes: receiving from a client information and payment for color consulting services, shipping a portable color-measuring instrument to the client; providing instructions to the client for operating the color-measuring instrument, receiving measured color data that was obtained by the client using the color-measuring instrument on multiple surfaces, formulating color recommendations based on the measured color data, and providing the color recommendations to the client. A design system for selecting color includes apparatuses that: gather and provide information, receive payment, ship the color-measuring instrument, and formulate the colors or color scheme.

20 Claims, 5 Drawing Sheets

Paint Color DNA Table

| Brand | L | C | h° |
|---|---|---|---|
| ▼ | | | |

| Hue | Family | Value | Chroma |
|---|---|---|---|
| | ▼ | | |

LRV

White / Off-White
☐ W

[Search 🔍 ▼]

| Save | Name | Brand | # | L | C | h° | Hue | Family | Value | Chroma | LRV | Sample |
|---|---|---|---|---|---|---|---|---|---|---|---|---|
| ☐ | Black Night | SW | 001 | 28.0 | 1.6 | 272 | 2.3 | PB | 2.7 | 0.3 | 2.5 | |
| ☐ | Black Bean | BM | 022 | 28.4 | 1.5 | 229 | 4.4 | Blue | 2.8 | 0.4 | 2.3 | |

COLOR DESIGN PROCESS AND SYSTEM

FIELD THE INVENTION

Various embodiments of this invention relate to processes and systems for selecting and recommending colors and color schemes, for example, for design purposes. Particular embodiments, for instance, assist clients with color selection based on existing surface colors.

BACKGROUND OF THE INVENTION

In the past, color strategists have traveled to client locations and assisted clients in selection of colors, for example, of paint, for instance, for building interiors, exteriors, or both. Further, color-measuring instruments have been developed that color strategists have used to collect measured color data, for example, from multiple surfaces. Still further, color recommendations have been formulated, for example, by color strategists, including based on measured color data, for instance, from multiple surfaces, and color strategists have provided such color recommendations to their clients. Travel time, however, and distance, have limited how many clients a particular color strategist can serve in a given amount of time. Even further, in the past, it was often not possible to create a refined degree of color harmony with the human eye alone, for example, due to fluctuating lighting conditions, context, individual color acuity and the overall psychophysical human response to color, as examples. For instance, without a specialized process, devices, apparatuses, and tools, it was not reasonable or physically possible for a person to search innumerable paint colors, materials and products from innumerable manufacturers in order to create a color design plan, for example, based on the actual color data values of a person's home exterior or interior contents, as examples. For these and other reasons, room for improvement exists in the way color strategists serve their clients. For example, potential for benefit exists in the way measured color data is obtained, handled, and communicated, for example, color data from multiple surfaces. Potential for benefit exists, for instance, for process and systems that make color consulting more efficient, more reliable, more-easily alterable, or a combination thereof, as examples. Potential for benefit exists in these and other areas that may be apparent to a person of skill in the art who has studied this document.

SUMMARY OF PARTICULAR EMBODIMENTS OF THE INVENTION

Various embodiments are or include a method or process (e.g., a design process), for example, for selecting color. Different embodiments include different combinations of specific acts. Certain embodiments, include for instance, at least acts of: receiving information and payment from a client, providing to the client a color-measuring instrument and instructions, receiving measured color data from the client, and formulating color recommendations and providing them to the client. In various embodiments, the client obtains the measured color data using the color-measuring instrument. Various embodiments improve the way color strategists serve their clients. For example, a number of embodiments improve the way measured color data is obtained, handled, or communicated, for example, color data from multiple surfaces. Further, various embodiments provide improved process, systems, or both, for example, that make color consulting more efficient, more reliable, more-easily alterable, or a combination thereof. Even further, certain embodiments reduce travel time of color strategists, which has limited how many clients a particular color strategist can serve in a given amount of time. Particular embodiments reduce the time color strategists need to spend traveling to client locations to assist clients in selection of colors, for example, of paint, for instance, for building interiors, exteriors, or both. Various embodiments also allow clients to be served that are significantly farther away. Further, various embodiments use color-measuring instruments to collect measured color data, for example, from multiple surfaces. Still further, various embodiments provide to clients color recommendations based on measured color data from multiple surfaces. Improvement exists in these and other areas that may be apparent to a person of skill in the art who has studied this document.

Specific embodiments include, for example, receiving from a client, for example, through a computer network, information about the client. Further, various embodiments include receiving from the client, for instance, through the computer network, payment, for example, for color consulting services. Still further, a number of embodiments include shipping to the client, for instance, after the payment is received, a (e.g., portable) color-measuring instrument. Even further, various embodiments include providing to the client instructions for using the color-measuring instrument. Further still, a number of embodiments include receiving from the client measured color data, for example, from multiple surfaces. For example, in various embodiments, the color data is received through the computer network, for instance, after the shipping to the client the color-measuring instrument. Moreover, in a number of embodiments, the measured color data was obtained by the client using the color-measuring instrument. Even further still, various embodiments include formulating color recommendations based on the measured color data from the multiple surfaces, providing to the client the color recommendations, or both.

Further, in particular embodiments, the information about the client includes an address (e.g., for the client), the shipping to the client includes shipping the color-measuring instrument to the address, the instructions for using the color-measuring instrument are provided to the client through the computer network, or a combination thereof, as examples. Still further, in various embodiments, the color-measuring instrument includes a colorimeter, a spectrophotometer, or both. Even further, in some embodiments, the design process, for example, is specifically for selecting color for an interior of a building. For instance, in certain embodiments, the multiple surfaces are within the interior of the building, the color recommendations are for the interior of the building, or both. On the other hand, in some embodiments, the design process is for selecting color for an exterior of a building. In particular embodiments, for example, the multiple surfaces are exterior to the building, the color recommendations are for the exterior of the building, or both. Further still, in some embodiments, the multiple surfaces include (e.g., at least one of): flooring, carpeting, rugs, furniture, upholstery, textiles, décor, pillows, artwork, counter tops, cabinetry, plumbing fixtures, and lighting fixtures. Even further still, in certain embodiments, the multiple surfaces include (e.g., at least one of): roofing material, windows, doors, gutters, downspouts, brick, stone, stucco, siding, pavers, concrete, and lighting fixtures.

In certain embodiments, the measured color data is received from the client after the measured color data is transmitted (e.g., by Bluetooth) from the (e.g., portable) color-measuring instrument to a computer, for example, operated by the client. Further, in some embodiments, the act of formulating the color recommendations is performed automatically, for instance, using at least one computer. For example, in particular embodiments, the act of formulating the color recommendations is performed (e.g., automatically) using artificial intelligence. Still further, in various embodiments, the color recommendations include (e.g., specific) product recommendations, recommendations for specific paint colors, recommendations for coordinating materials, or a combination thereof, for instance. Even further, in a number of embodiments, the design process includes providing to the client a return label, for example, for returning the color-measuring instrument, for instance, after the measured color data is obtained (e.g., by the client) from the multiple surfaces. Further still, in some embodiments, the act of formulating the color recommendations includes identifying, using, or both, hue families that the measured color data belongs to. Even further still, in particular embodiments, the act of formulating the color recommendations includes (e.g., for each measured color) using: lightness, chroma, hue, value, light reflectance value, or a combination thereof. Moreover, in a number of embodiments, the act of formulating the color recommendations includes selecting a color scheme that is (e.g., at least one of): monochromatic, complementary, split complementary, double complementary, diad, dichromatic, triadic, analogous, and tetrad. Further specific embodiments include a combination of such features.

Still other specific embodiments include various design systems, for example, for selecting color. In a number of embodiments, for example, the design system includes (e.g., at least) a (e.g., first) information gathering apparatus, for example, operating on a server, for instance, that receives (e.g., from a client), for example, through a computer network, information about the client. Further, various embodiments include a payment apparatus, for instance, operating on a server, for example, that receives from the client (e.g., through the computer network), payment, for instance, for color consulting services. Still further, a number of embodiments include a shipping apparatus, that (e.g., after the payment is received), ships (e.g., to the client) a (e.g., portable) color-measuring instrument. Even further, various embodiments include a (e.g., first) information providing apparatus (e.g., operating on a server) that provides (e.g., to the client) instructions, for example, for using the color-measuring instrument. Further still, a number of embodiments include a (e.g., second) information gathering apparatus (e.g., operating on a server) that receives (e.g., from the client), for instance, through the computer network, for example, after the shipping to the client the color-measuring instrument, measured color data from multiple surfaces. In various embodiments, the measured color data has been obtained (e.g., by the client) using the color-measuring instrument. Even further still, various embodiments include a color formulating apparatus, for example, that formulates color recommendations based on the measured color data from the multiple surfaces. Moreover, a number of embodiments include a (e.g., second) information providing apparatus (e.g., operating on a server), that provides (e.g., to the client) the color recommendations. In addition, various other embodiments of the invention are also described herein, and other benefits of certain embodiments are described herein or may be apparent to a person of skill in this area of technology.

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

Figure 1:
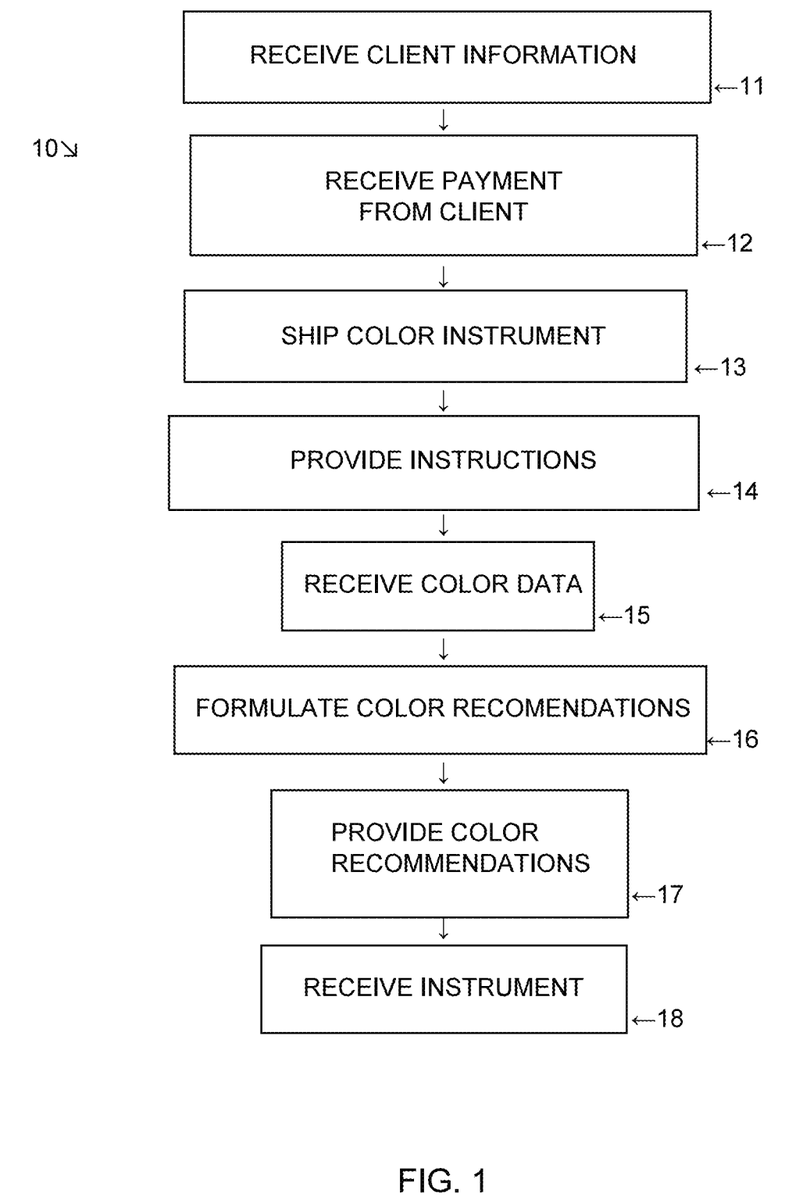
FIG. 1 is a flowchart illustrating an example of a design process for selecting color.
Figure 2:
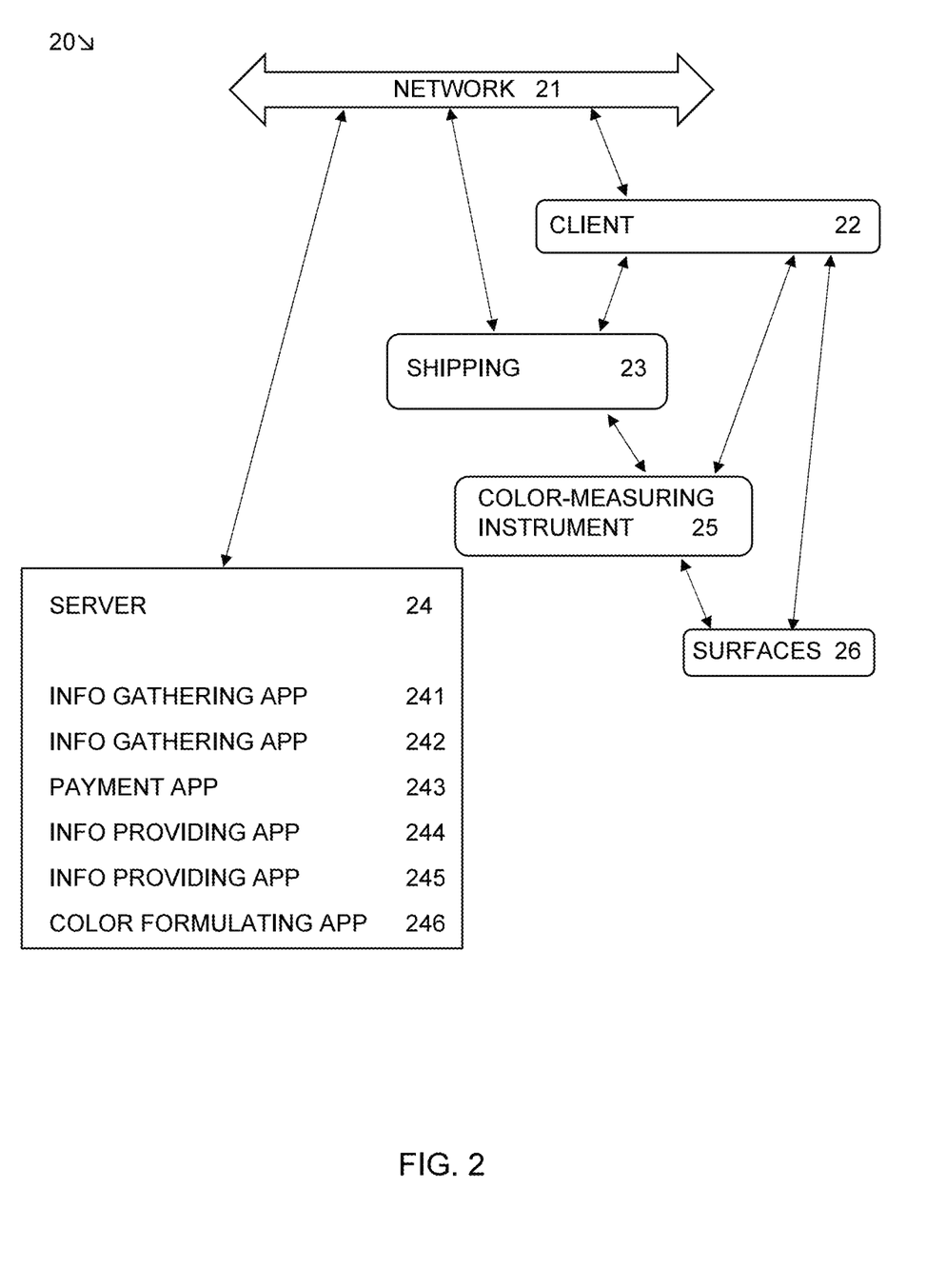
FIG. 2 is a block diagram illustrating an example of a design system for selecting color.

This patent application describes, among other things, various processes and systems, for example, for selecting or recommending to clients colors, color schemes, or both, for instance, for design purposes. FIGS. 1 and 2 show examples. In a number of embodiments, color schemes are based on existing surface colors measured, for example, by the client without a color strategist traveling to the worksite. In various embodiments, a color-measuring instrument is used to measure the colors, which has been shipped to the client. Described herein are examples of certain embodiments, and certain aspects thereof. Other embodiments may differ from the particular examples described in detail herein.

FIG. 1 shows design process 10 for selecting color. In the embodiment illustrated, design process 10 includes illustrated acts 11-18. These acts are performed for one client, but process 10 can be repeated for any number of different clients. Various structure involved in the acts of process 10 is illustrated in FIG. 2. Process 10 includes, for example, receiving (e.g., in act 11 shown in FIG. 1) from a client (e.g., 22 shown in FIG. 2), through a computer network (e.g., 21), information about the client. In the embodiment shown, process 10 also includes receiving (e.g., in act 12), for example, from the client, (e.g., 22, for instance, through computer network 21), payment, for example, for color consulting services (e.g., color recommendations provided in act 17 described below). Further, process 10 includes (e.g., after the payment is received in act 12) shipping (e.g., to client 22) a (e.g., portable) color-measuring instrument (e.g., 25 shown in FIG. 2). Still further, process 10 includes providing (e.g., in act 14, for example, to client 22) instructions, for instance, for using the color-measuring instrument (e.g., 25). Even further, process 10 includes receiving (e.g., in act 15, for example, from client 22, for instance, through computer network 21, for example, after the shipping in act 13, for instance, to client 22 the color-measuring instrument), measured color data, for instance, from multiple surfaces (e.g., 26). In a number of embodiments, the measured color data (e.g., received in act 15) was obtained by the client (e.g., 22) using the color-measuring instrument (e.g., 25). In various embodiments, the color-measuring instrument (e.g., 25) measures spectral data. Furthermore, in a number of embodiments, the color data or spectral data is recorded, for example, by the color-measuring instrument (e.g., 25) or by a (e.g., Bluetooth) connected device or computer, for example, operated by the client (e.g., 22). Further still, in the embodiment illustrated, process 10 includes formulating (e.g., in act 16) color recommendations, for example, based on the measured color data (e.g., received in act 15) from the multiple surfaces (e.g., 26). Even further still, in the embodiment shown, process 10 includes providing (e.g., in act 17, for example, to client 22) the color recommendations (e.g., formulated in act 16). Color recommendations may be provided (e.g., in act 17), for example, by e-mail, text, or posting on a website, as examples.

In certain embodiments, the information (e.g., received in act 11) about the client (e.g., 22) includes an address, for example, for the client. Further, in particular embodiments, the shipping (e.g., in act 13), for example, to the client (e.g., 22) includes shipping the color-measuring instrument specifically to the address (e.g., received in act 11), for instance, for client 22. Still further, in a number of embodiments, the instructions for using the color-measuring instrument are provided (e.g., in act 14), for example, to client 22, through the computer network (e.g., 21). Even further, in some embodiments, the color-measuring instrument (e.g., 25) includes a colorimeter. Still further, in various embodiments, the color-measuring instrument (e.g., 25) includes a spectrophotometer. Even further still, in certain embodiments, the color-measuring instrument (e.g., 25) includes both a colorimeter and a spectrophotometer.

In a number of embodiments, the design process (e.g., 10) is (e.g., specifically) for selecting color for an interior, for example, of a building. Further, in various embodiments, the multiple surfaces (e.g., 26, or for which color data is received in act 15) are within the interior, for instance, of the building, the color recommendations (e.g., formulated in act 16, provided in act 17, or both) are for the interior, for example, of the building, or both. In contrast, in some embodiments, the design process (e.g., 10) is (e.g., specifically) for selecting color for an exterior, for instance, of a building. Still further, in various embodiments, the multiple surfaces (e.g., 26, or for which color data is received in act 15) are exterior, for example, to the building, the color recommendations are for the exterior, for instance, of the building, or both. Even further, in a number of embodiments, the multiple surfaces (e.g., 26) include at least one of: flooring, carpeting, rugs, furniture, upholstery, textiles, décor, pillows, artwork, counter tops, cabinetry, plumbing fixtures, and lighting fixtures. Moreover, in certain embodiments, the multiple surfaces (e.g., 26) include (e.g., at least) 2, 3, 4, 5, 6, 7, 8, 9, 10, 11, 12, or all of the items identified in the previous sentence, as other examples. Further still, in some embodiments, the multiple surfaces (e.g., 26) include at least one of: roofing material, windows, doors, gutters, downspouts, brick, stone, stucco, siding, pavers, concrete, and lighting fixtures. Moreover, in particular embodiments, the multiple surfaces (e.g., 26) include (e.g., at least) 2, 3, 4, 5, 6, 7, 8, 9, 10, 11, or all of the items identified in the previous sentence, as other examples.

In some embodiments, the measured color data is received (e.g., in act 15) from the client (e.g., 22) after the measured color data has been transmitted, for example, by Bluetooth, for instance, from the color-measuring instrument (e.g., 25) to a computer operated by the client (e.g., 22). Further, in certain embodiments, the act (e.g., 16) of formulating the color recommendations is performed automatically, for example, using at least one computer (e.g., a server, desktop, laptop, tablet, or mobile phone). As used herein, "automatically" means without a person (e.g., color strategist) being involved (e.g., in formulating the color recommendations), at least for those particular color recommendations. Still further, in particular embodiments, the act (e.g., 16) of formulating the color recommendations is performed (e.g., automatically) using artificial intelligence. Even further, in various embodiments, the color recommendations (e.g., formulated in act 16, provided in act 17, or both) include (e.g., specific) product recommendations, recommendations for specific paint colors (e.g., including manufacturer's identifying information), recommendations for coordinating materials, or a combination thereof, as examples. Further still, in some embodiments, the design process (e.g., 10) includes, for example, providing to the client (e.g., 22) a return label for returning (e.g., receiving in act 18) the color-measuring instrument (e.g., 25), for example, after the measured color data (e.g., received in act 15) is obtained (e.g., by client 22 using instrument 25) from the multiple surfaces (e.g., 26).

In particular embodiments, the act (e.g., 16) of formulating the color recommendations includes identifying hue families, for example, that the measured color data belongs to, using the hue families (i.e., for formulating the color recommendations), or both. Further, in certain embodiments, the act (e.g., 16) of formulating the color recommendations includes (e.g., for each measured color, surface 26, or both), using one or more of: lightness, chroma, hue, value, and light reflectance value. Moreover, in particular embodiments, the act (e.g., 16) of formulating the color recommendations includes (e.g., at least) 2, 3, 4, or all of the items identified in the previous sentence, as other examples. Still further, in some embodiments, the act (e.g., 16) of formulating the color recommendations includes selecting a color scheme that is at least one of: monochromatic, complementary, split complementary, double complementary, diad, dichromatic, triadic, analogous, and tetrad. Moreover, in particular embodiments, the act (e.g., 16) of formulating the color recommendations includes (e.g., at least) 2, 3, 4, 5, 6, 7, 8 or all of the items identified in the previous sentence, as other examples. Even further, other embodiments include all conceivable combinations and sub combinations of the features of a design process (e.g., 10) described in the previous paragraphs. Even further still, even other embodiments include all conceivable combinations and sub combinations of the features of a design process described herein or known in the art, for example, of color selection.

FIG. 2 illustrates an example of an apparatus, assembly, or design system, for example, for selecting color. Such a system interacts with client 22 and surfaces 26 in this example, but client 22 and surfaces 26 in FIG. 2 are not considered to be part of the apparatus, assembly, or design system for selecting color. In the embodiment shown, system 20 for selecting color includes (e.g., at least) specific apparatuses that gather information, provide information, collect payment, ship (e.g., instruments), and formulate (e.g., color) recommendations. Specific apparatuses are shown in FIG. 2, but in various embodiments, different apparatuses described herein may be combined, may be divided into different components (e.g., which may be at different locations or on different servers), or both. In the embodiment illustrated, system 20 includes first information gathering apparatus 241, which is operating on server 24. In this example, information gathering apparatus 241 receives (e.g., from client 22), through computer network 21, information about client 22. An example of such information is an address, for example, of client 22. Further, computer network 21 may be or include the Internet, a mobile phone network, or both. In the embodiment shown, system 20 also includes payment apparatus 243, also operating on a server (e.g., server 24 shown). In the embodiment shown, payment apparatus 243, receives from client 22, through computer network 21, payment for color consulting services (e.g., color selection recommendations). An example of such payment is credit card payment.

In the embodiment illustrated, various apparatuses are shown (and described herein) as operating on one server (e.g., 24), but in various embodiments, different apparatuses described herein may operate on different servers. Further, particular apparatuses shown or described herein may operate on different servers or may be divided between multiple servers. Still further, as used herein, "a server" includes multiple servers and is not restricted to a previously mentioned server (e.g., 24). In the embodiment shown, system 20 also includes shipping apparatus 23, that may be or include, for example, a shipping company, a shipping department (e.g., within a company or an organization), storage (e.g., for color-measuring instruments), an inventory management system, etc. In the embodiment illustrated, shipping apparatus 23 ships (e.g., to client 22) color-measuring instrument 25 (e.g., after the payment is received, for instance, by payment apparatus 243).

System 20 also includes, in the embodiment shown, first information providing apparatus 244, which is also operating on a server (e.g., server 24 shown). In this example, information providing apparatus 244 provides (e.g., to client 22) instructions for using color-measuring instrument 25. Examples of how information can be provided (e.g., as described herein) include through e-mail, text, a website, or a web page, as examples. System 20 also includes, in the embodiment illustrated, second information gathering apparatus 242, operating on a server (e.g., 24 shown). In this embodiment, information gathering apparatus 242 receives (e.g., from client 22), measured color data, for example, from multiple surfaces (e.g., 26). Further, in various embodiments, the measured color data (e.g., received at information gathering apparatus 242) has been obtained (e.g., by client 22) using (e.g., portable) color-measuring instrument 25. Further still, in various embodiments, the measured color data (e.g., received at information gathering apparatus 242) has been obtained after the shipping (e.g., by shipping apparatus 23, for instance, to client 22) of color-measuring instrument 25. Even further, in the embodiment shown, the measured color data (e.g., received at information gathering apparatus 242) has been obtained through computer network 21. Still further, in the embodiment illustrated, system 20 also includes color formulating apparatus 246 that formulates color recommendations, for example, based on the measured color data from the multiple surfaces (e.g., 26, for instance, received at second information gathering apparatus 242). Even further still, in this particular embodiment, system 20 also includes second information providing apparatus 245, that provides (e.g., to client 22) the color recommendations (e.g., formulated by apparatus 246). In the embodiment shown, information providing apparatus 245 is also operating on a server (e.g., 24 shown). Moreover, specific embodiments include one or more apparatuses that provide various combinations and sub combinations of the features of a design process (e.g., 10) described herein. Even further still, even other embodiments include one or more apparatuses that provide all conceivable combinations and sub combinations of the features (e.g., of a design process) described herein or known in the art, for example, of color selection. Various apparatuses described herein, for example, include computer executable code, for example, software, for instance, that perform the various functions or roles described herein. Further, in particular embodiments, information gathering apparatuses and information providing apparatuses described herein may be combined or may be divided into smaller component parts.

Various embodiments are or include color data measurement-based color design processes (e.g., 10) and systems (e.g., 20). In various embodiments, a client (e.g., 22) purchases (e.g., in act 12, through apparatus 243, or both) color consulting services, for example, from an online store or business that performs the process (e.g., 10), operates the systems (e.g., 20), or both. In some embodiments, (e.g., in act 11, at apparatus 241, or both) client information is received, for example, an account profile, which may include, for instance, email, full name, shipping address, and phone number. In various embodiments, this information is automatically collected, for example, at a website (e.g., on server 24), for instance, upon check out. Further, in various embodiments, a color guide, for instance, describing how to measure color (e.g., using a colorimeter or spectrophotometer) is emailed (e.g., in downloaded PDF format), for example, to client 22 (e.g., in act 14, via information providing apparatus 244, or both). Still further, in various embodiments, a (e.g., portable) color measurement instrument (e.g., 25, for instance, colorimeter, spectrophotometer, or both) is sent (e.g., in act 13, via shipping apparatus 23, or both) to clients (e.g., 22), for example, via express, priority, overnight or regular mail. In a number of embodiments, services are not limited to clients (e.g., 22) in the United States, for example. Once the color measurement instrument (e.g., 25) is received, the client (e.g., 22) follows the instructions (e.g., "how to measure color guide", for instance, provided by apparatus 244, in act 14, or both) for using the color-measuring instrument (e.g., 25). For example, the client (e.g., 22) may measure (e.g., some or all) relevant (e.g., fixed) finishes, important elements, or a combination thereof (e.g., surfaces 26), for example, as instructed. In some embodiments, the client (e.g., 22) connects the color measurement instrument (e.g., 25), for example, via Bluetooth, to the client's personal device, for instance, smartphone, tablet, or computer.

Even further, in particular embodiments, for example, for a one-on-one consult with a human color strategist, the client (e.g., 22) may email screen shots of measurements (e.g., CIE L*a*b* and/or LCh values), for instance, from the device. Alternatively, in certain embodiments, an app (e.g., on the device or on a server) may send the data (e.g., measured color data from multiple surfaces, for example, 26) (e.g., directly) to the color strategist. In some embodiments, for example, having a fully automated consult, the application's algorithm, artificial intelligence, or both, may collect and utilize the client's color data values (e.g., taken from surfaces 26), for example, to create a color design plan (e.g., in act 16, using apparatus 246, or both). In various embodiments, color designers (e.g., color strategists) or artificial intelligence (AI) (e.g., within an app or running on a server, for example, 24) is used to analyze the color data values received (e.g., at apparatus 242, in act 15, or both) in order to align the data values (e.g., measured color data from multiple surfaces, for instance, 26) with paint colors and/or other architectural, building, or décor materials, as examples. In some embodiments, an algorithm and/or artificial intelligence may align the color data values received and coordinate them (e.g., harmoniously) with paint, building materials and décor products. In various embodiments, the algorithm and/or artificial intelligence may automate steps, for example, of looking up color data values for paint colors, aligning them with the data values (e.g., measured color data from multiple surfaces, for example, captured using the instrument (e.g., 25) to measure interior or exterior elements like windows, rugs, art, etc. In particular embodiments, machine learning is used. In certain embodiments with advanced coding, the app (e.g., color formulating apparatus 246) is able to recommend (e.g., in act 17) not just paint colors that match, but also that project, as well as appropriate paint sundries, architectural coating products, décor, artwork, accessories and more. In a number of embodiments, products from multiple manufacturers can be included in the analysis (e.g., color recommendations), for example, because the products have a CIE L*a*b* value. For a wide range of products and items, such values have been measured. In various embodiments, the product delivered (e.g., in act 17, from apparatus 245, or both) to the client (e.g., 22) is a color palette plan, for example, with relevant design advice and recommendations, for instance, for specific paint color(s) and/or other coordinating architectural, building or décor materials, as examples. In particular embodiments, direct links, for example, to recommended products, may also be included (e.g., within the color recommendations).

Figure 3:
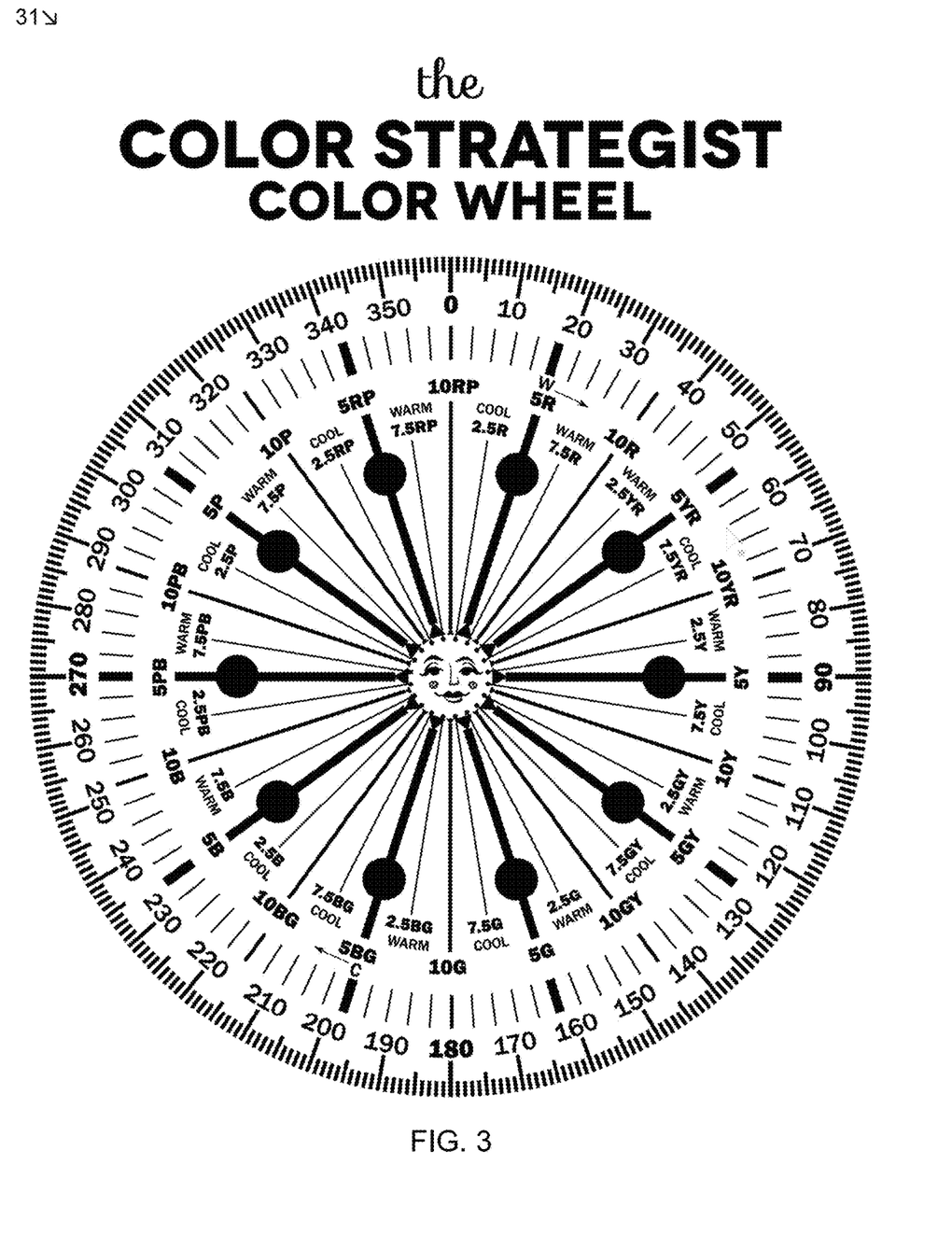
FIG. 3 illustrates an example of a Color Strategist Color Wheel.
Figure 4:
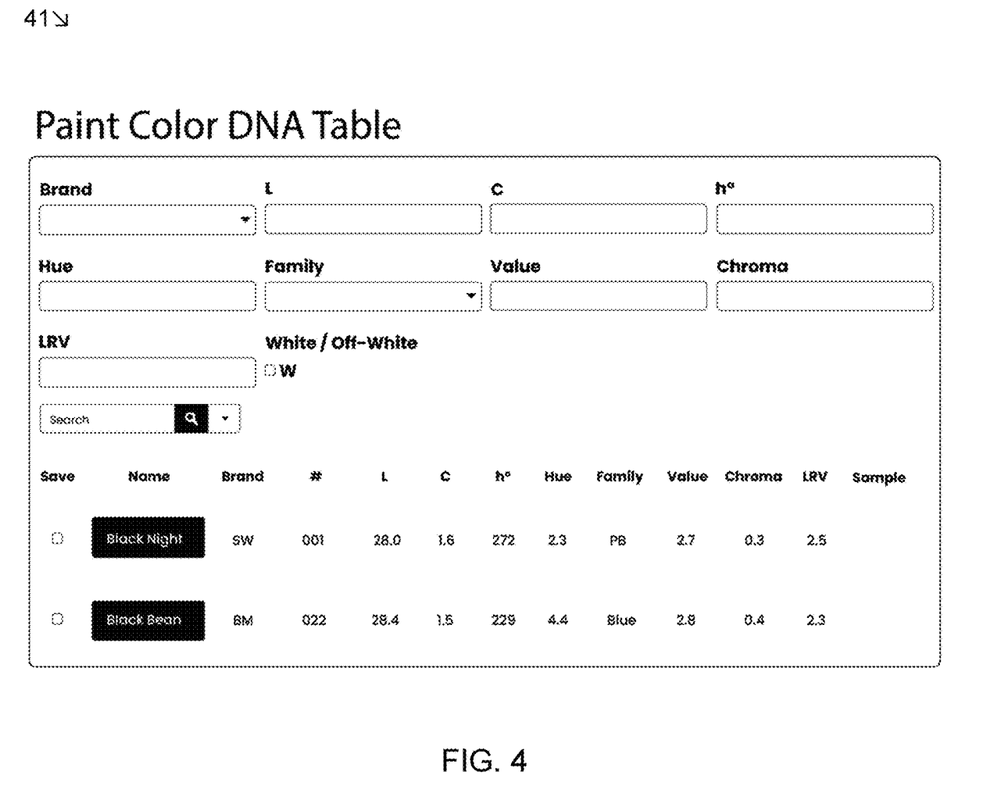
FIG. 4 illustrates one page of an example of a Paint Color DNA Table.

In some embodiments, the client (e.g., 22) is provided (e.g., with the color instrument shipped in act 13, through shipping apparatus 23, or both) a return label. Further, in particular embodiments, the client (e.g., 22) can reuse the original box to return the color measurement instrument (e.g., 25, for instance, received in act 18), for example, via or to the color strategist, company, or to shipping apparatus 23. Alternatively, in some embodiments, the client (e.g., 22) can choose to keep the color measurement instrument (e.g., for further use, additional cost, or both). Still further, in certain embodiments, for example, in addition to the data (e.g., measured color data from multiple surfaces, for instance, 26, for example, from the color measuring instrument 25), certain tools can be used (e.g., in act 16, in color formulating apparatus 246, or both), for instance, to formulate the color recommendations. Examples of such tools include the Color Strategist Color Wheel shown in FIG. 3, the Paint Color DNA Table shown in FIG. 4, and the Fandeck shown in FIG. 5. In various embodiments, these tools can be physical printed documents or can be digital (e.g., online or embedded within computer code). Other tools include, computer code, for instance, a mobile application (app), for example, with an algorithm, artificial intelligence, or both. In various embodiments, this tool (e.g., fully) automates the process of aligning the client's submitted color data values (e.g., measured color data from multiple surfaces 26, for example, from the color measuring instrument 25) with paint colors and/or other architectural, building or décor materials, for example.

The color wheel (e.g., shown in FIG. 3) decodes the hue portion of the color notation. Hue answers the question: "is it the right color?" Value (lightness/darkness) and Chroma (colorfulness) are secondary, in a number of embodiments, because if it's the wrong color, it doesn't matter how light/dark or colorful it is. The design and functionality of the color wheel references hue, value, and chroma ordered in 3-dimensional color space. In some embodiments, the color wheel is digitized. Further, if a color strategist knows how to read a color notation, it may be easy for the color strategist to conjure the color in her head for a point of reference. A notation may literally give the color strategist an idea of the color. Still further, in some embodiments, the actual colors of the color wheel (e.g., shown in FIG. 3) do not have to be precisely accurate, which means a digitized representation (e.g., within or used by color formulating apparatus 246) of the color wheel colors is sufficient. In addition, a black and white version of the color wheel may make as much sense to a color strategist as it does in color. Other color wheels may be less useful or even useless when digitized because it may be difficult or impossible to accurately render real-life color accurately on an illuminated screen. In some embodiments, the color wheel functionality (e.g., shown in FIG. 3) and the process (e.g., 10) described herein, may solve this issue.

Figure 5:
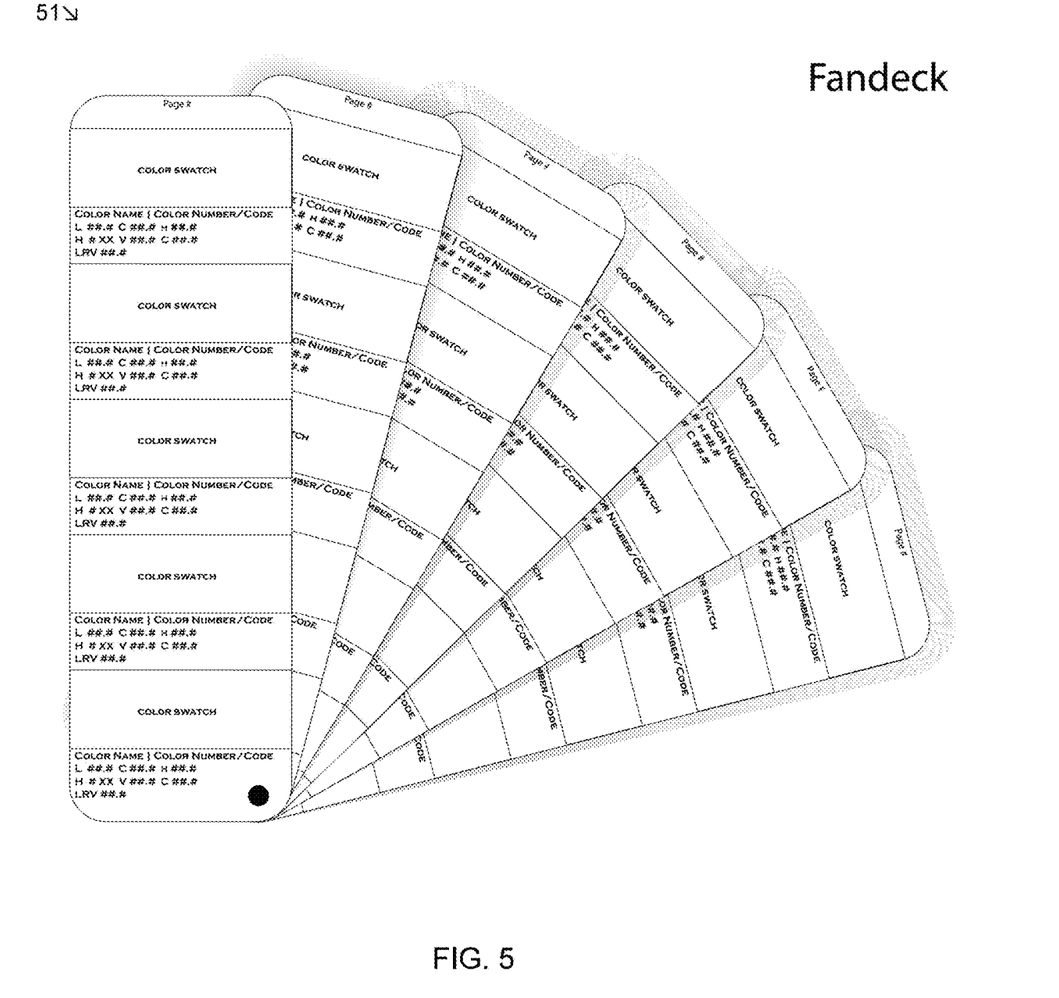
FIG. 5 illustrates an example of a Fandeck.

In certain embodiments, the Paint Color DNA Table (e.g., shown in FIG. 4) is a WordPress plugin, for example. In particular embodiments, the DNA Table functions as a data base and/or a core part of an interface, for instance, of an app that automates strategically aligning color data values. The Fandeck (e.g., shown in FIG. 5) may be physical, digital, or both. It organizes the LCh color space colors, for example, with the LCh notation printed on a swatch of the color. In various embodiments, this may be either on the front or the back and the colors may be primarily ordered by lightness, chroma or hue, as examples. In a number of embodiments, the result is a color-trend aware, customized color palette plan, for example, based on rational, objective, tangible color data values taken directly, for instance, from the home's exterior or interior fixed finishes, important elements, or both. Further, in various embodiments, the process or system is unique, among other things, because it is a process for color specification that, in many embodiments, does not depend on human subjective opinion, unconfirmed color acuity, an intangible color sensibility, outdated (meaning unaware of current color trends), randomly curated artificial intelligence results, or a combination thereof, as examples. Still further, FIG. 5 is a black line drawing that illustrates how the Fandeck includes a color notation where: L=Lightness, C=Chroma, h=hue angle, H=Hue Family, V=Value, C=Chroma, and LRV=(Light Reflectance Value).

In various embodiments, the data (e.g., measured color data from multiple surfaces 26, for example, from the color measuring instrument 25) doesn't interpret itself. Different embodiments either require a trained, creative human linchpin to analyze and compose the results into a color design plan, or in other embodiments, analysis and results are delivered (e.g., formulated in act 16, provided in act 17, or both) via a (e.g., specially designed) algorithm and/or artificial intelligence application. Further, in a number of embodiments, the data values (e.g., measured color data from multiple surfaces, for instance, 26, for example, from the color measuring instrument 25) that are aligned/coordinated may include one or more of: CIELab, LCh, and Munsell notations. These are also known as lightness, chroma, hue, value and light reflectance value. Still further, individually these are also known as attributes. In various embodiments, color attributes are aligned either manually or in an automated process. Even further, various embodiments result (e.g., formulated in act 16, provided in act 17, or both) in a harmonious color design plan. For example, some embodiments align the hue angle from the set of data received (e.g., in act 15) with The Color Strategist Color Wheel (e.g., shown in FIG. 4). Further still, some embodiments identify what hue families the items measured (e.g., measured color data from multiple surfaces, for example, 26, for instance, from the color measuring instrument 25) belong to. Even further still, in various embodiments, color harmony is based, for example, on color relationships.

Further, in a number of embodiments, once hue families are established, (e.g., classic) color relationships are mapped out (e.g., in act 16). Examples include monochromatic, complementary, split complementary, double complementary, diad, dichromatic, triadic, analogous, and tetrad color schemes. Still further, in various embodiments, chroma indicates how colorful or grayed a color appears. In some embodiments, for example, colors with the same or similar chroma values are considered (e.g., in act 16) to harmonize. Even further, in a number of embodiments, value indicates how light and bright a color looks. Still further, in some embodiments, colors with the same or similar luminance, light reflectance value, or lightness, as examples, are considered (e.g., in act 16) to harmonize. In certain embodiments, these (e.g., quantifiable) color attributes are used (e.g., in act 16) to (e.g., strategically) align the color recommendations to create harmonies, for example, with perfect pitch. This can be done (e.g., in act 16), in different embodiments, either manually or via algorithm/artificial intelligence. For example, in some color recommendations, colors within the same hue family range are considered to go together. Likewise, in some embodiments, colors with the same or similar chroma or value are considered (e.g., in act 16) to harmonize.

In some embodiments, quantifying color by three dimensions of hue, luminance (value), and chroma, for example, provides for notating and arranging color into an orderly framework of categories. For instance, whites may have a Munsell Value of 9.12 to 10.00 and a Munsell Chroma of less than 0.55, and off-whites may have a Munsell Value of 9.12 to 10.00 and a Munsell Chroma of 0.55 to 1.15. Further, light near neutrals may have a Munsell Value of 8.12 up to 9.12 and a Munsell Chroma 0.1 to 1.00, and near neutrals may have a Munsell Value of 0.1 up to 8.12 and a Munsell Chroma of 0.1 to 1.00. Still further, colors may have a Munsell Value of 0.1 up to 9.12 and a Munsell Chroma of 1.25 and up. Using these brackets, for example, along with hue, value, chroma and LRV, some embodiments include specific manual guidance and/or automated algorithms, for instance, for harmonious color schemes and design plans (e.g., formulated in act 16, provided in act 17, or both). For example, in some embodiments, in creating a white-on-white color combination, a difference of at least 0.20 in Chroma may indicate or guarantee a level of contrast so neither color of white will make the other appear dirty or dingy. In a number of embodiments, hue, value, chroma and/or LCh values are incorporated into a color design workflow that starts with evidence-based analysis (e.g., captured color measurements, for example, received in act 15, with apparatus 242, or both) of fixed finishes and important elements (e.g., surfaces 26) of interior, exterior, or both. In different embodiments, this is done manually or is automated. In some embodiments, it is manual, meaning a person is involved. In some embodiments, for example, a color strategist pulls the data together, analyzes it, and then translate it into actionable color decisions (e.g., in act 16). In various embodiments, color recommendations are provided (e.g., in act 17), for example, recommending what paint colors go well with the measured color data (e.g., received in act 15) from the multiple surfaces (e.g., 26). In particular embodiments, the process (e.g., 10, or at least acts 15, 16, and 17 are automated. Further, some embodiments include testing colors in situ, for example, with paint chips and/or samples. For example, in some embodiments, for instance, in the final steps of the process, (e.g., large) color chips are used that also include a hue/value chroma, LCh and LRV notation printed on the chip itself. In the past, color chips and samples labeled with notations were not available. In various embodiments, large color chips are either printed with special inks or painted with real paint, as examples. Many novel aspects include incorporation of prior pieces into a new process. Various embodiments include an orderly framework of color notations and tools designed to streamline and automate matching paint/products with data from the contents or structure of a person's actual home or business, for example.

Various embodiments include shipping the device (e.g., color-measuring instrument 25, for example, with shipping apparatus 23, in act 13, or both), collecting measurement results (e.g., electronically), for instance, in act 15, with apparatus 242, or both), analyzing the data (e.g., manually or via algorithm or AI, for example, in application 246, act 16, or both), developing a custom color strategy (e.g., based on factual, objective color measurements, for instance, taken directly from the client's home, for example, in application 246, act 16, or both). Certain embodiments consider or use (e.g., in application 246, act 16, or both) design aesthetics, personal color preferences, natural and artificial lighting, geographic region, or a combination thereof, for example, to refine or customize an advanced color strategy (e.g., provided in act 17, by apparatus 245, or both). In some embodiments, an algorithm, artificial intelligence, or both, will render (e.g., almost immediate) coordinating color answers (e.g., provided in act 17, by apparatus 245, or both), but in particular embodiments, the process (e.g., 10) is also supplemented with access to a human color strategist, for example, if desired (e.g., by customer 22). In addition, in a number of embodiments, the process (e.g., 10) is executable at any time, is not limited by location, or both. In various embodiments, for example, this eliminates the need for an on-site, boots-on-the-ground visit (i.e., by a human color strategist). In various embodiments, the color measurement instrument (e.g., 25) is an off-the-shelf item. Several companies make (e.g., portable) color measurement devices, for example, Variable, Inc., DataColor, Colorix, and Nix (which may be trademarks, for example, registered or otherwise).

Other embodiments include an apparatus or method of obtaining or providing an apparatus or information, for instance, that include a novel combination of the features described herein. Even further embodiments include at least one means for accomplishing at least one functional aspect described herein. The subject matter described herein includes various means for accomplishing the various functions or acts described herein or that are apparent from the structure and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well.

Further, various embodiments of the subject matter described herein include various combinations of the acts, structure, components, and features described herein, shown in the drawings, or that are known in the art. Moreover, certain procedures can include acts such as manufacturing, obtaining, or providing components that perform functions described herein or in the documents that are incorporated by reference. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:
1. A design process for selecting color, the process comprising at least acts of:
receiving from a client, through a computer network, information about the client;

receiving from the client, through the computer network, payment for color consulting services;

after the payment is received: shipping to the client a portable color-measuring instrument;

providing to the client instructions for using the portable color-measuring instrument;

receiving from the client, through the computer network, after the shipping to the client the portable color-measuring instrument, measured color data from multiple surfaces, wherein the measured color data was obtained by the client using the portable color-measuring instrument;

automatically formulating a custom color palette based on the measured color data from the multiple surfaces; and providing to the client the color recommendations based on the custom color palette.

2. The design process of claim 1 wherein:

the information about the client includes an address for the client;

the shipping to the client includes shipping the portable color-measuring instrument to the address for the client; and the instructions for using the portable color-measuring instrument are provided to the client through the computer network.

3. The design process of claim 1 wherein the portable color-measuring instrument comprises a colorimeter.

4. The design process of claim 1 wherein the portable color-measuring instrument comprises a spectrophotometer.

5. The design process of claim 1 wherein the design process is for selecting color for an interior of a building, the multiple surfaces are within the interior of the building, and the color recommendations are for the interior of the building.

6. The design process of claim 1 wherein the design process is for selecting color for an exterior of a building, the multiple surfaces are exterior to the building, and the color recommendations are for the exterior of the building.

7. The design process of claim 1 wherein the multiple surfaces include at least one of: flooring, carpeting, rugs, furniture, upholstery, textiles, décor, pillows, artwork, counter tops, cabinetry, plumbing fixtures, and lighting fixtures.

8. The design process of claim 1 wherein the multiple surfaces include at least one of: roofing material, windows, doors, gutters, downspouts, brick, stone, stucco, siding, pavers, concrete, and lighting fixtures.

9. The design process of claim 1 wherein the measured color data is received from the client after the measured color data is transmitted by Bluetooth from the portable color-measuring instrument to a computer operated by the client.

10. The design process of claim 1 wherein the act of formulating the color recommendations is performed automatically using at least one computer.

11. The design process of claim 1 wherein the act of formulating the color recommendations is performed automatically using artificial intelligence.

12. The design process of claim 1 wherein the color recommendations include specific product recommendations.

13. The design process of claim 1 wherein the color recommendations include recommendations for specific paint colors.

14. The design process of claim 1 wherein the color recommendations include recommendations for coordinating materials.

15. The design process of claim 1 wherein the design process includes providing to the client a return label for returning the portable color-measuring instrument after the measured color data is obtained from the multiple surfaces.

16. The design process of claim 1 wherein the act of formulating the color recommendations comprises: identifying hue families that the measured color data belongs to; and the formulating of the color recommendations comprises using the hue families.

17. The design process of claim 1 wherein the act of formulating the color recommendations comprises, for each measured color, using: lightness, chroma, hue, value, and light reflectance value.

18. The design process of claim 1 wherein the act of formulating the color recommendations comprises selecting a color scheme that is at least one of: monochromatic, complementary, split complementary, double complementary, diad, dichromatic, triadic, analogous, and tetrad.

19. The design process of claim 1 wherein:

the information about the client includes an address for the client;

the shipping to the client includes shipping the portable color-measuring instrument to the address for the client;

the portable color-measuring instrument comprises at least one of a colorimeter and a spectrophotometer;

the design process is for selecting color for an interior or an exterior of a building, the multiple surfaces are within the interior or on the exterior of the building, and the color recommendations include recommendations for the interior or the exterior of the building;

the multiple surfaces include at least one of: flooring, carpeting, rugs, furniture, upholstery, textiles, décor, pillows, artwork, counter tops, cabinetry, plumbing fixtures, roofing material, windows, doors, gutters, downspouts, brick, stone, stucco, siding, pavers, concrete, and lighting fixtures;

the measured color data is received from the client after the measured color data is transmitted from the portable color-measuring instrument to a computer operated by the client;

the color recommendations include specific product recommendations;

the color recommendations include recommendations for specific paint colors;

the act of formulating the color recommendations comprises: identifying hue families that the measured color data belongs to; and using the hue families for formulating the color recommendations; and the act of formulating the color recommendations comprises selecting a color scheme that is at least one of: monochromatic, complementary, split complementary, double complementary, diad, dichromatic, triadic, analogous, and tetrad.

20. A design system for selecting color, the system comprising at least:

a first information gathering apparatus, operating on a server, that receives from a client, through a computer network, information about the client;

a payment apparatus, operating on a server, that receives from the client, through the computer network, payment for color consulting services;

a shipping apparatus, that after the payment is received, ships to the client a portable color-measuring instrument;

a first information providing apparatus, operating on a server, that provides to the client instructions for using the portable color-measuring instrument;
a second information gathering apparatus, operating on a server, that receives from the client, through the computer network, after the shipping to the client the portable color-measuring instrument, measured color data from multiple surfaces, wherein the measured color data has been obtained by the client using the portable color-measuring instrument;
a color formulating apparatus that automatically formulates a custom color palette based on the measured color data from the multiple surfaces; and
a second information providing apparatus, operating on a server, that provides to the client the color recommendations based on the custom color palette.

* * * * *